Patented Mar. 15, 1938

2,111,461

UNITED STATES PATENT OFFICE 2,111,461

COATING COMPOSITION

Fred K. Shankweiler, Kalamazoo, Mich., assignor to Hercules Powder Company, Wilmington, Del., a corporation of Delaware No Drawing. Application September 13, 1935, Serial No. 40,413

8 Claims. (Cl. 134—79)

This invention relates to an improvement in coating compositions and more particularly to an improvement in nitrocellulose coating compositions.

Heretofore, coating compositions containing nitrocellulose have found wide use in the arts.

These compositions have usually contained various formulating ingredients such as resins, plasticizers, pigments, etc. When applied to a surface with a spray-gun, such compositions dry with very irregular surfaces, known to the art as "orange-peeled" surfaces. An "orange-peeled" surface is unattractive in appearance, and must ordinarily be sanded and polished to produce an attractive finish. The sanding and polishing operations are expensive, and various methods have been proposed to eliminate either or both of them.

A method has been described by the prior art, by which certain thermoplastic protective coating compositions are applied to a surface, dried, and then sanded free of "orange-peel" in the usual manner. The sanded film is then heated to a temperature at which it is softened sufficiently to flow under the influence of its surface tension to produce a smooth, glossy film. This property of the film to level-out to a smooth, glossy surface when heated has been termed "flow-back" by the art.

This method of finishing presents a distinct advantage over the older method, in that it entirely eliminates the laborious polishing operation, but has been of very limited application due to the requirement that the composition applied must be thermoplastic. Thermoplastic lacquer compositions suited for application by this method have shown a disadvantage in that when heated to produce flow-back, as described in prior art method they become insoluble and infusible. Hence the finish, when completed, cannot be patched or repaired. Further, such compositions are productive of a finish lacking in hardness, and hence readily marred; and again, such finishes tend to bloom on standing, and while the bloom may be wiped off, its occurrence is of distinct disadvantage.

Now, in accordance with this invention, coating compositions are provided which are of a thermoplastic nature and give excellent flow-back on heating, and which, at the same time, are free from the disadvantages of prior compositions of similar type, in that they are productive of finishes of relatively great and desirable hardness, in that they will not bloom on standing and, in fact, in that they do not become insoluble and infusible except on heating repeatedly or for a period of time far beyond that necessary to obtain a smooth finish, and hence are productive of a finish which may be patched or repaired.

The compositions in accordance with this invention thus are productive of smooth, high gloss finishes on heating and of a finish of desirable hardness and resistance to marring, and, at the same time, a finish capable of being patched or repaired if it becomes marred.

The compositions in accordance with this invention involve essentially nitrocellulose, a plasticizer solid or crystalline at normal atmospheric temperatures and a synthetic resin having compatibility under temperature conditions at which flow-back of the composition will occur. The synthetic resin preferably will be one produced by the esterification of a terpene-maleic anhydride, with an alcohol selected from the group consisting of ethylene glycol, diethylene glycol, borneol, glycerol or mixtures thereof. Thus, for example, suitable synthetic resins are ethylene glycol terpinene maleate, diethylene glycol terpinene maleate, glycerol terpinene maleate, bornyl terpinene maleate, mixed bornyl-glycol terpinene maleate, ethylene glycol terpinolene maleate, diethylene glycol terpinolene maleate, glycerol terpinolene maleate, bornyl terpinolene maleate, mixed bornyl-glycol terpinolene maleate, ethylene glycol pinene maleate, diethylene glycol pinene maleate, bornyl pinene maleate, mixed bornyl-glycol pinene maleate, ethylene glycol dipentene maleate, diethylene glycol dipentene maleate, bornyl dipentene maleate, mixed bornyl-glycol dipentene maeate, etc.

The synthetic resins, such as, for example, those which are included in the group indicated above, may be readily produced by reacting a suitable terpene, as, for example, terpinene, terpinolene, dipentene or pinene, and maleic anhydride in the presence of heat, and subsequently reacting the resultant terpene maleate with glycol, diethylene glycol, borneol or with borneol and glycol, such reaction being readily effected in the presence of heat with or without the use of an esterification catalyst, as described more fully in U. S. Patent No. 1,993,025 to Peterson & Littmann, U. S. Patents Nos. 1,993,027; 1,993,031 and 1,993,032 to Peterson, and U. S. Patent No. 1,993,034 to Humphrey. The glycol, diethylene glycol, borneol or mixed borneol-glycol-terpene maleate will be unmodified, that is to say, the use of reagents such as to modify the ultimate maleate will be avoided. By way of illustration, for example, resins produced from ingredients shown in the following table will be satisfactory:

|  | Glycol ester | Bornyl ester | Diethylene Glycol ester | Mixed ester |
|---|---|---|---|---|
| Terpinene maleic anhydride | Parts 270 | Parts 225 | Parts 225 | Parts 450 |
| Borneol |  | 400 |  | 400 |
| Glycol | 80 |  |  | 68 |
| Diethylene glycol |  |  | 115 |  |

Compositions in accordance with this invention will contain a plasticizer solid or crystalline at normal atmospheric temperatures. In general, however, it will be desirable that a liquid plasticizer also be included. The use of a crystalline or solid plasticizer, without the inclusion of a liquid plasticizer, will be more particularly resorted to where the synthetic resin included in the composition is inherently of a soft type, as, for example, in the case of mixed bornyl-glycol terpinene maleate. Where the synthetic resin used is of a relatively hard type, a liquid plasticizer will desirably be included in order to prevent crystallization of the crystalline plasticizer in large crystals.

The crystalline plasticizer comprising an essential ingredient in accordance with this invention may be any suitable crystalline or solid plasticizer, as, for example, triphenyl phosphate, diethyl diphenyl urea, ethyl acetanilide, etc. When a liquid plasticizer is included, such may be any suitable liquid plasticizer, as, for example, dibutyl phthalate, tributyl phosphate, tricresyl phosphate, etc.

In producing compositions in accordance with this invention any usual nitrocellulose such as is commonly used in lacquers and lacquer enamels may be used, it being preferred that the nitrocellulose be of low viscosity, say of the order of one-quarter or one-half second (Hercules), it being understood, of course, that the ultimate viscosity of the nitrocellulose in solution and in the final film at the temperature of flow-back will govern.

Generally speaking, compositions involving a practical embodiment of this invention will contain nitrocellulose in amount in excess of and generally not less than the amount of synthetic resin. The synthetic resin will be contained in amount less than and generally not in amount more than the amount of nitrocellulose. The crystalline plasticizer will generally be contained in amount less than the amount of synthetic resin, and where both a crystalline and a liquid plasticizer are contained, the liquid plasticizer will usually be in amount less than the amount of crystalline plasticizer, and the total amount of plasticizer will usually be in amount less than the amount of synthetic resin.

Compositions in accordance with this invention may contain pigments or other ingredients, which may be desirably included, so long as ingredients which will deleteriously affect the advantageous characteristics of the compositions are not used. Pigments usually used in lacquers and lacquer enamels may be used, it being desirable, however, where the use of basic substances such as zinc oxide is desired or necessary, that such substances be used in limited amount.

For the practical use of compositions in accordance with this invention, they may be applied to the surface to be finished by spraying, dipping, brushing, or otherwise, in the form of a solution in a suitable solvent or solvent mixture, then sanded to remove any irregularities in the surface such as "orange-peel" or brush-marks, and then baked at a temperature sufficient to cause flow-back and the production of a smooth finish. Any well known solvent or solvent mixture commonly used in lacquers or lacquer enamels may be used. The only limitations upon the solvent or solvent mixture are that it necessarily will be a solvent for all the ingredients of the composition, with the exception, of course, of ingredients such as pigments which may be included and which are insoluble, that it evaporates at a rate suited to the method by which the finished composition is to be applied, and that it remains a solvent for the ingredients of the composition during evaporation.

Compositions involving practical embodiment of this invention and adapted for flow-back at about 100° C. will comprise nitrocellulose on the basis of a viscosity of one-half or one-quarter second within about the range 25.5–35.4%, by weight, of the non-volatile ingredients including 11.5 to 14.4% pigment, a synthetic resin from the group indicated in amount within about the range 21.4–40.0%, and a solid or crystalline plasticizer in amount within about the range 19–27.8%. Where a liquid plasticizer is also included, the total amount of plasticizer will be within about the range 13.6–27.8%. It will be understood that where both a crystalline or solid and a liquid plasticizer are used, the relative proportion of the two types of plasticizers may be widely varied within the range of amount of total plasticizer, i. e., 13.6–27.8%.

It will be understood that the above limits may vary where flow-back at a temperature other than about 100° C. is desired. Thus for flow-back at (say) 125° C. the amount of resin and plasticizer will be decreased, where for flow-back at (say) 80° C. the resin and plasticizer will be increased.

Compositions embodying this invention and which will be found to have excellent flow-back and to be productive of finishes of excellent durability and hardness, and, at the same time, capable of being repaired and patched, may, for example, be made up on the following formulae:

|  | (1) | (2) | (3) | (4) | (5) | (6) | (7) |
|---|---|---|---|---|---|---|---|
|  | Parts | Parts | Parts | Parts | Parts | Parts | Parts |
| Nitrocellulose ¼" (Hercules) | 6.5 | 6.5 | 7.0 | 7.0 | 7.0 | 7.0 |  |
| Nitrocellulose ½" (Hercules) | 0.3 | 0.3 |  |  |  |  | 6.8 |
| Glycerol terpinene maleate | 6.5 | 9.75 |  |  |  |  | 6.5 |
| Bornyl terpinene maleate |  |  | 7.0 |  |  |  |  |
| Diethylene glycol terpinene maleate |  |  |  | 7.0 |  |  |  |
| Mixed bornyl glycol terpinene maleate |  |  |  |  | 7.0 | 4.0 |  |
| Triphenyl phosphate | 5.1 | 3.9 | 5.2 | 5.2 | 5.2 | 5.2 | 5.2 |
| Dibutyl phthalate | 0.6 | 0.4 |  |  |  |  |  |
| 1 carbon black 10 TiO₂ | 3.2 | 3.2 |  |  |  |  |  |
| Toluidine red |  |  | 2.5 | 2.5 | 2.5 | 2.5 |  |
| Iron oxide |  |  |  |  |  |  | 3.0 |

It will be understood that the above formulae are illustrative only, and that within the ranges heretofore given wide variation may be made in the amounts and proportions of the various ingredients; also, variously crystalline or normally solid plasticizers, or mixtures thereof other than triphenyl phosphate, may be used and, likewise, where a liquid plasticizer is desirably included, liquid plasticizers other than dibutyl phthalate may be used.

As illustrative of solvents which may be used, for example, the solvent may comprise ethyl acetate, butyl acetate, hexyl acetate, etc., or mixtures thereof and the solvent or solvent mixture may be admixed with, for example, xylol, toluol, butyl alcohol, etc., or mixtures thereof to form a solvent mixture. As typical of a solvent mixture adaptable for use in connection with the application, for example, a solvent mixture made up on the following formulae will be satisfactory:

|  | Parts | Parts |
|---|---|---|
| Butanol | 8.0 | 9.6 |
| Ethyl acetate | 10.0 | 12.0 |
| Butyl acetate | 19.1 | --- |
| Hexyl acetate | --- | 13.6 |
| Acetone | 2.0 | --- |
| Xylol | 3.0 | 1.5 |
| Toluol | 12.9 | 28.5 |
| Ethyl alcohol | 3.0 | --- |

In the practical use of the compositions in accordance with the above formulae, a solution thereof will be sprayed upon the surface to be finished, and the solution dried upon the surface under any desired conditions, either in the atmosphere or by sufficient heating to remove the solvent, for the formation of a film upon the surface. The film will then be sanded in the usual manner and to such an extent as may be necessary. The film will then be baked, for example, at a temperature about 100° C. to effect flow-back, which will result in the removal of the sanding marks. On cooling, a smooth, high-gloss, hard, durable finish will result. As indicated, the finish, if it becomes marred, may be readily repaired or patched by the mere application of a further quantity of the composition, drying, sanding, and baking. The baking will result in flow-back, which will blend the patch perfectly with the original finish, which, due to the fact that it does not become insoluble or infusible under the original baking, will flow and coalesce with the patch, leaving no line or ring of demarcation between the patch and the main body of the original finish.

As already mentioned, the compositions in accordance with this invention are productive of finishes of desirable hardness and, hence, resistance to marring. Thus, compositions in accordance with this invention will generally be productive of a finish having a hardness in excess of 100, as determined by the Pfund hardness meter, as compared with prior art compositions of similar type which have, generally speaking, a hardness usually considerably less than 100 as determined by the Pfund hardness meter.

It will be understood that the specific formulae given herein for solvents, etc., are given by way of illustration, and not by way of limitation of my invention.

It will be further understood that the term "flow-back" is used in the preceding description of this invention and in the claims appended hereto, in the sense used in the protective coating art, i. e., to mean the property of a film to level out surface irregularities, when heated to an elevated temperature after the elimination of the solvent.

This application is a continuation-in-part of my application for United States patent, Serial No. 756,975, filed December 11, 1934.

What I claim and desire to protect by Letters Patent is:

1. A protective and decorative coating composition productive of a hard, durable film having the characteristic of flow-back on heating which includes as ingredients nitrocellulose, a terpene-maleic anhydride synthetic resin compatible with nitrocellulose and a normally solid plasticizer, the said ingredients being so proportioned and in amounts sufficient to cooperate to give the composition the characteristic of flow-back at the desired temperature of baking.

2. A protective and decorative coating composition productive of a hard, durable film having the characteristic of flow-back on heating, which includes as ingredients nitrocellulose, a terpene-maleic anhydride synthetic resin consisting of a product of the esterification of a terpene-maleic anhydride with an alcohol selected from the group consisting of ethylene glycol, diethylene glycol, glycerol and bornyl alcohol and a normally solid plasticizer, the said ingredients being so proportioned and in amounts sufficient to cooperate to give the composition a characteristic of flow-back at the desired temperature of baking.

3. A protective and decorative coating composition productive of a hard, durable film having the characteristic of flow-back on heating, which includes as ingredients nitrocellulose, a terpene-maleic anhydride synthetic resin selected from the group consisting of diethylene glycol terpinene maleate, glycerol terpinene maleate, bornyl terpinene maleate, a mixed bornyl glycol terpinene maleate, glycol terpinolene maleate, ethylene glycol terpinolene maleate, glycerol terpinolene maleate, bornyl terpinolene maleate and a mixed bornyl glycol terpinolene maleate and a normally solid plasticizer, the said ingredients being so proportioned and in amounts sufficient to cooperate to give the composition the characteristic of flow-back at the desired temperature of baking.

4. A protective and decorative coating composition productive of a hard, durable film having the characteristic of flow-back on heating, which includes as ingredients nitrocellulose within the range of about 25.5% to about 35.4% by weight, a terpene-maleic anhydride synthetic resin compatible with nitrocellulose and in amount within the range of about 21.4% to about 40% by weight, and a normally solid plasticizer in amount within the range of about 19.0% to about 27.8% by weight, the said ingredients being so proportioned and in amounts sufficient to cooperate to give the composition a characteristic of flow-back at the desired temperature of baking.

5. A protective and decorative coating composition productive of a hard, durable film having the characteristic of flow-back on heating, which includes as ingredients nitrocellulose in amount within the range of about 25.5% to about 35.4% by weight, a terpene-maleate from the group consisting of glycol terpinene-maleate, diethylene glycol terpinene maleate, glycerol terpinene-maleate, bornyl terpinene maleate, a mixed bornyl glycol terpinene maleate, glycol terpinolene maleate, ethylene glycol terpinolene maleate, glycerol terpinolene maleate, bornyl terpinolene maleate and a mixed bornyl glycol terpinolene maleate in amount within the range of about 21.4% to about 40% by weight, and a normally solid plasticizer in amount within the range of about 19.0% to about 27.8% by weight, the said ingredients being so proportioned and in amounts sufficient to cooperate to give the composition the characteristic of flow-back at the desired temperature of baking.

6. A protective and decorative coating composition productive of a hard, durable film having the characteristic of flow-back on heating, which includes as ingredients nitrocellulose, a terpene-maleic anhydride synthetic resin compatible with nitrocellulose, a liquid plasticizer and a normally solid plasticizer, the said ingredients being so proportioned and in amounts sufficient to cooperate to give the composition the characteristic of flow-back at the desired temperature of baking.

7. A protective and decorative coating composition productive of a hard, durable film having the characteristic of flow-back on heating, which includes as ingredients nitrocellulose in amount within the range of about 25.5% to about 35.4% by weight, a terpene-maleic anhydride synthetic resin compatible with nitrocellulose and within the range of about 21.4% to about 40% by weight, a liquid plasticizer and a normally solid plasticizer, the plasticizers together being in amount within about the range of 13.6% to about 27.8% by weight, the said ingredients being so proportioned and in amounts sufficient to cooperate to give the composition the characteristic of flow-back at the desired temperature of baking.

8. A protective and decorative coating composition productive of a hard, durable film having the characteristic of flow-back on heating which includes as ingredients nitrocellulose, glycol terpinene maleate and a normally solid plasticizer, the said ingredients being so proportioned and in amounts sufficient to cooperate to give the composition the characteristic of flow-back at the desired temperature of baking.

FRED K. SHANKWEILER.

Certificate of Correction

Patent No. 2,111,461.  March 15, 1938.

FRED K. SHANKWEILER

It is hereby certified that errors appear in the printed specification of the above numbered patent requiring correction as follows: Page 1, second column, line 27, for "maeate" read *maleate;* lines 50 to 55, inclusive, strike out the heading to the table and insert instead the following·

| Glycol ester | Bornyl ester | Diethylene glycol ester | Mixed ester |
|---|---|---|---| and that the said Letters Patent should be read with these corrections therein that the same may conform to the record of the case in the Patent Office.

Signed and sealed this 3d day of May, A. D. 1938.

[SEAL]

HENRY VAN ARSDALE,
*Acting Commissioner of Patents.*

21.4% to about 40% by weight, and a normally solid plasticizer in amount within the range of about 19.0% to about 27.8% by weight, the said ingredients being so proportioned and in amounts sufficient to cooperate to give the composition the characteristic of flow-back at the desired temperature of baking.

6. A protective and decorative coating composition productive of a hard, durable film having the characteristic of flow-back on heating, which includes as ingredients nitrocellulose, a terpene-maleic anhydride synthetic resin compatible with nitrocellulose, a liquid plasticizer and a normally solid plasticizer, the said ingredients being so proportioned and in amounts sufficient to cooperate to give the composition the characteristic of flow-back at the desired temperature of baking.

7. A protective and decorative coating composition productive of a hard, durable film having the characteristic of flow-back on heating, which includes as ingredients nitrocellulose in amount within the range of about 25.5% to about 35.4% by weight, a terpene-maleic anhydride synthetic resin compatible with nitrocellulose and within the range of about 21.4% to about 40% by weight, a liquid plasticizer and a normally solid plasticizer, the plasticizers together being in amount within about the range of 13.6% to about 27.8% by weight, the said ingredients being so proportioned and in amounts sufficient to cooperate to give the composition the characteristic of flow-back at the desired temperature of baking.

8. A protective and decorative coating composition productive of a hard, durable film having the characteristic of flow-back on heating which includes as ingredients nitrocellulose, glycol terpinene maleate and a normally solid plasticizer, the said ingredients being so proportioned and in amounts sufficient to cooperate to give the composition the characteristic of flow-back at the desired temperature of baking.

FRED K. SHANKWEILER.

Certificate of Correction

Patent No. 2,111,461.                                          March 15, 1938.

FRED K. SHANKWEILER

It is hereby certified that errors appear in the printed specification of the above numbered patent requiring correction as follows: Page 1, second column, line 27, for "maeate" read *maleate;* lines 50 to 55, inclusive, strike out the heading to the table and insert instead the following·

| Glycol ester | Bornyl ester | Diethylene glycol ester | Mixed ester |
|---|---|---|---| and that the said Letters Patent should be read with these corrections therein that the same may conform to the record of the case in the Patent Office.

Signed and sealed this 3d day of May, A. D. 1938.

[SEAL]

HENRY VAN ARSDALE,
*Acting Commissioner of Patents.*

Certificate of Correction

Patent No. 2,111,461.  March 15, 1938.

FRED K. SHANKWEILER

It is hereby certified that errors appear in the printed specification of the above numbered patent requiring correction as follows: Page 1, second column, line 27, for "maeate" read *maleate;* lines 50 to 55, inclusive, strike out the heading to the table and insert instead the following·

| Glycol ester | Bornyl ester | Diethylene glycol ester | Mixed ester |
|---|---|---|---| and that the said Letters Patent should be read with these corrections therein that the same may conform to the record of the case in the Patent Office.

Signed and sealed this 3d day of May, A. D. 1938.

[SEAL]

HENRY VAN ARSDALE,
*Acting Commissioner of Patents.*